United States Patent

[11] 3,583,165

[72] Inventors Samuel R. West
 Tulsa, Okla.;
 Thomas A. Sutton, Corry, Pa.
[21] Appl. No. 864,477
[22] Filed Oct. 7, 1969
[45] Patented June 8, 1971
[73] Assignee The Dow Chemical Company
 Midland, Mich.

[54] METHOD FOR SEALING OFF PASSAGEWAYS
 11 Claims, 1 Drawing Fig.
[52] U.S. Cl. ............................................ 61/35
[51] Int. Cl. ............................................ E02d 3/12
[50] Field of Search ............................................ 61/35, 36,
 39; 166/294, 293

[56] References Cited
 UNITED STATES PATENTS
 2,434,301 1/1948 Wertz ........................ 61/36

| | | | |
|---|---|---|---|
| 3,359,742 | 12/1967 | Blatter................... | 61/39X |
| 3,447,608 | 6/1969 | Fry et al................. | 166/294X |
| 3,478,520 | 11/1969 | Andy...................... | 61/35 |
| 3,500,934 | 3/1970 | Magnuson............... | 61/35X |

Primary Examiner—David J. Williamowsky
Assistant Examiner—Philip C. Kannan
Attorneys—Griswold and Burdick, Bruce M. Kanuch and William R. Norris ABSTRACT: A method is provided for sealing off underground passageways, e.g. mine tunnels, drifts and the like. A sufficient quantity of concrete and/or cement is introduced into the passageway through a shaft connecting the passageway with a work surface located above the passageway to substantially seal off the passageway. After the concrete and/or cement has set, the mass is internally fractured to provide fractures normal to the horizontal axis of the passageway and exposing a portion of the inner surface of the passageway. The fractures are then squeezed with an expanding cement.

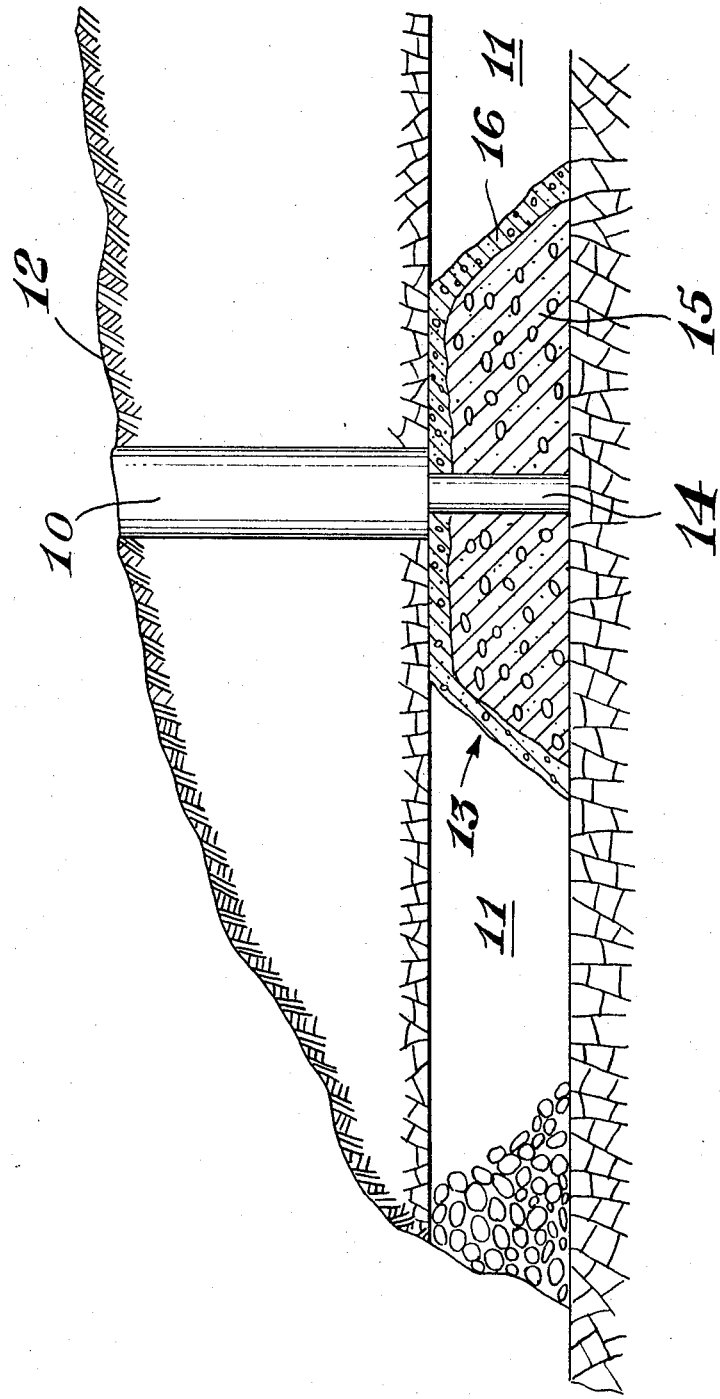
INVENTORS.
Samuel R. West
Thomas A. Sutton
BY
Bruce M Kanuch
ATTORNEY

METHOD FOR SEALING OFF PASSAGEWAYS

BACKGROUND OF THE INVENTION

One of the most difficult to control sources of large scale water pollution is the drainage of acid mine waters into water suppliers, e.g. streams, lakes, etc. The drainage water from some mines, e.g. coal mines, is acid in reaction. This acidity is due to the presence of water soluble sulfates of iron, aluminum, magnesium and other minerals which hydrolyze in water to give an acid reaction. Factors responsible for the formation of acid mine waters are the presence of pyrites in coal and associated strata, exposure of these materials to water and air by mining, the chemical oxidation of fine pyrites and the concurrent growth of iron oxidizing and sulfur oxidizing bacteria which aid the oxidation of the pyrite. These mine waters flow over the surface and seep through permeable earthen formations into nearby water sources reducing the alkalinity of the water. Iron and other mineral hydroxides precipitate in the water sources smothering biologic life natural to the waterways. Down stream the higher sulfate content constitutes an unsolved problem for municipal and industrial water supplies. The river grows acid and corrosion of structures and floating equipment increases.

Several attempts have been made to solve these problems, e.g. purification processes, sealing of the ground, etc., without complete success.

The present invention concerns a method for sealing off underground passageways, e.g. mine tunnels, drifts and the like. The method can be employed as an aid in preventing water pollution, directing the flow of effluents from mines and to seal off abandoned tunnels and the like to prevent dangerous situations for curious children and adults. This method also fines particular utility in sealing abandoned mine tunnels whereby normal entry through entrances is prevented because of cave-ins and the like.

SUMMARY OF THE INVENTION

In the present method a substantially vertical shaft is provided connecting the passageway to be sealed off and a work area located above the tunnel. The work area may be the surface of the ground, the floor of a second passageway located above the first passageway or the like. A sufficient quantity of concrete and/or cement is then introduced through the shaft to form a dam or dike which substantially seals off the passageway at the location of the shaft. After the mass of concrete and/or cement has set up it is internally fractured and/or cement is then provide fractures therein which are substantially normal to the horizontal axis of the passageway being sealed off, exposing a portion of the inner surfaces of the passageway to the fractures. The fractures are squeezed with an expanding cement to fill voids existing between the mass and the inner surfaces of the passageway tunnel which communicate with the fractures. Upon setting up the expanding cement forms a tight seal between the mass and the inner surfaces of the passageway.

BRIEF DESCRIPTION OF THE DRAWINGS

The FIGURE shows a side elevation partly in section of a passageway which has been sealed off by the method of the present invention.

DETAILED DESCRIPTION OF THE INVENTION

With reference to the FIGURE the method of the present invention comprises first providing a substantially vertical shaft 10 connecting the passageway 11 to be sealed off with a work area 12 above the tunnel. Concrete and/or cement is then introduced through the shaft 10 to provide a mass 13. After the concrete and/or cement has hardened a second substantially vertical shaft or borehole 14 is provided in the mass. The mass is then fractured to provide fractures which are normal to the horizontal axis of the passageway and exposes a portion of the inner surfaces to the fractures. The fractures are then squeezed with an expanding cement to fill any voids existing between the mass 13 and the inner surface of the passageway and which communicate with the fractures.

In a preferred embodiment, a low cost high aggregate containing concrete is first introduced into passageway to form a dam 15 which does not completely seal off the passageway because of the flowability of concrete of this type. The mass of aggregate concrete is allowed to set. A second low mobility concrete 16 is then introduced into the passageway through the shaft to complete the mass 13 to the roof. Of course, if one desires a low mobility concrete may be employed to form the entire dam. However, this is usually not as economical as the use of both types of concrete. Likewise, any number of steps of emplacement and setting may be used to seal off the passageway.

As previously indicated, after the concrete forming the dam has set it is then internally fractured and the fracture squeezed with an expanding cement. The concrete mass 13 is fractured by drilling a substantially vertical shaft 14 substantially through the mass 13 and introducing a fracturing fluid under sufficient pressure to fracture the mass. The fractures will be normal to the axis of the least principle stress which is along the horizontal axis of the passageway. The fracturing fluid may comprise any of those known in the oil and gas well fracturing art, e.g. thickened water and heavy oils and the like. When fracturing fluids of these types are employed they are removed from the shaft 14 and fractures, e.g. by pumping, prior to the squeezing thereof with an expanding cement. As an alternative the expanding cement itself can be pumped into the shaft 14 under sufficient pressure to fracture the mass 13 and then be squeezed into any existing voids between the mass and inner surfaces of the passageway. Likewise, the fracturing and squeezing steps may be repeated a number of times to assure a tight seal between the mass and the inner surfaces of the passageway.

Aggregate concrete as employed herein means any of the well-known cements, e.g. Portland, pozzolans and the like, containing aggregate extenders, such as gravel, sand, pebbles, slag, cinders or the like. For economic reasons other extenders such as fly ash, bentonite and the like can also be employed.

Low mobility cement and/or concretes as employed herein mean cements which are pumpable or flowable but which become readily self-supporting when they come to rest. An example of such a cement is that disclosed in U.S. patent application Ser. No. 749,683, filed Aug. 2, 1968. In this application the low mobility cement comprises from 5—9 percent by weight of $CaSO_4$ or $CaSO_4 \cdot \frac{1}{2} H_2O$; 51—65 percent by weight Portland cement, and from 30 to 40 percent water. The cement is characterized by having an initial low viscosity but having an accelerated rate of gelation as compared to other cements.

Expanding cement as employed herein means cements which expand in volume upon setting. Cements of these types are well known in the art especially the art associated with the treatment of oil and gas wells.

What We claim is:

1. A method for sealing off horizontal underground passageways which comprises:
   a. providing a shaft connecting said passageway with a work surface located above said passageway;
   b. introducing a sufficient quantity of concrete through the shaft to form a mass which substantially seals off the passageway at the location of the shaft;
   c. allowing the concrete to set;
   d. internally fracturing the mass to provide fractures therein which are normal to horizontal axis of the passageway and exposing a portion of the inner surfaces of the passageway to said fractures;
   e. squeezing said fractures with expanding cement; and
   f. allowing the expanding cement to set.

2. The method as defined in claim 1 wherein a coarse aggregate concrete is first introduced into said passageway and allowed to set and form a dam which partially seals off said passageway and then introducing a low mobility cement on top of said dam in a sufficient amount to substantially seal off said passageway.

3. The method as defined in claim 2 wherein the set mass is internally fractured by drilling a substantially vertical shaft therein, and introducing an expanding cement therein under sufficient pressure to provide fractures therein which are normal to the horizontal axis of said passageway.

4. The method as defined in claim 2 wherein said passageway is a mine tunnel.

5. The method as defined in claim 1 wherein the concrete comprises a low mobility concrete.

6. The method as defined in claim 1 wherein the set concrete mass is internally fractured by drilling a borehole therein and introducing a fracturing fluid therein under pressure sufficient to internally fracture said mass.

7. The method as defined in claim 6 wherein said fracturing fluid is removed from said borehole and fractures prior to squeezing them with said expanding cement.

8. The method as defined in claim 1 wherein said passageway is a mine tunnel.

9. The method as defined in claim 1 wherein
a. step (b) comprises first introducing a high aggregate containing concrete to partially seal off said passageway, allowing the aggregate concrete to set, and introducing a sufficient additional amount of a low mobility concrete therein to substantially seal off the passageway; and
b. step (d) comprises drilling a substantially vertical shaft through said mass and introducing an expanding cement therein under sufficient pressure to produce fractures in said dam which are normal to the horizontal axis of said passageway to expose a portion of the inner surface of the passageway to said fractures and filling voids existing between the inner surfaces of said passageway and mass which communicate with said fractures with said expanding cement.

10. The method as defined in claim 9 wherein said work surface is the surface of the ground above said passageway.

11. The method as defined in claim 9 wherein said work surface is the floor of a second underground passageway located above said passageway to be sealed off.